O. J. SMITH.
Whiffletree-Hook.

No. 159,851.  Patented Feb. 16, 1875.

WITNESSES:
E. Wolff
A. F. Terry

INVENTOR:
O. J. Smith
BY
ATTORNEYS.

UNITED STATES PATENT OFFICE.

OTHNIEL J. SMITH, OF WAUWATOSA, WISCONSIN.

IMPROVEMENT IN WHIFFLETREE-HOOKS.

Specification forming part of Letters Patent No. 159,851, dated February 16, 1875; application filed December 12, 1874.

*To all whom it may concern:*

Figure 1:
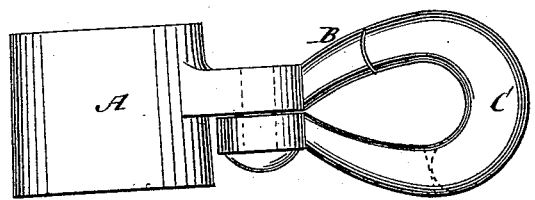
Figure 2:
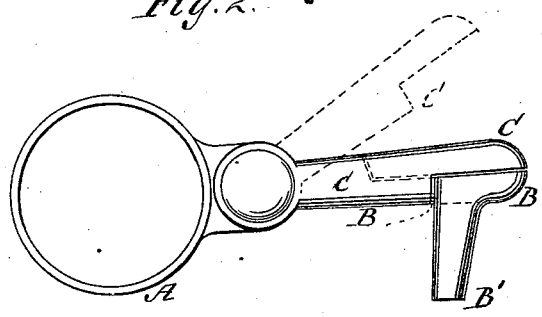

Be it known that I, OTHNIEL J. SMITH, of Wauwatosa, in the county of Milwaukee and State of Wisconsin, have invented a new and Improved Whiffletree-Hook, of which the following is a specification:

In the accompanying drawing, Figure 1 represents a top view, and Fig. 2 a side view, of my improved whiffletree-hook.

Similar letters of reference indicate corresponding parts.

The invention consists in a hook formed of a stationary part, having a downward extension or projection at the end, and a pivoted correspondingly-curved part, arranged to fold or lap upon the other, as hereinafter described.

In the drawing, A represents the ferrule or sleeve of the hook, which may be readily applied in the usual manner to the end of the whiffletree. The lower half, B, of the hook is produced in one piece therewith, and provided at the end of the hook-shaped portion with a downward-extending lug or projection, B'. The upper half, C, of the hook is pivoted sidewise to the lower half, B, near ferrule A, and made also in the shape of a hook, but in opposite direction thereto, both being recessed at their overlapping front parts to form, when the upper part is seated on the lower, an eye for the ring or slot of the trace.

The trace is first placed over the lower part, and carried back toward its rear end; the upper part is then brought down, and the trace placed over both, so as to lock them tightly together, and prevent their opening, and the unhooking of the trace by the retaining-lug or projection of the lower part.

The trace is thereby not liable to be detached in going down hill, or by other causes, but retained in the hook, without the use of a spring, in strong and secure manner, while allowing at the same time its ready attaching and detaching on separating the hook parts, by sliding the trace end back from the upper hook. The hook may be easily placed onto another tree in case of breakage of the same, without going to a blacksmith's shop for repairs.

I do not claim the lower portion B B' of the hook; but

Having thus described my invention, I claim as new and desire to secure by Letters Patent—

A whiffletree-hook, formed of the pivoted overlapping part C, combined with the stationary part B, having lug B', as shown and described.

OTHNIEL J. SMITH.

Witnesses:
 ELWIN SMITH,
 MATHIES HANSON.